(12) United States Patent
Marron et al.

(10) Patent No.: US 12,730,221 B2
(45) Date of Patent: Sep. 8, 2026

(54) COMBINED HIGH-ENERGY LASER (HEL) SYSTEM OR OTHER SYSTEM AND LASER DETECTION AND RANGING (LADAR) SYSTEM

(71) Applicant: Raytheon Company, Waltham, MA (US)

(72) Inventors: Joseph Marron, Manhattan Beach, CA (US); Joseph M. Fukumoto, Rancho Palos Verdes, CA (US)

(73) Assignee: Raytheon Company, Arlington, VA (US)

( * ) Notice: Subject to any disclaimer, the term of this patent is extended or adjusted under 35 U.S.C. 154(b) by 1060 days.

(21) Appl. No.: 17/210,121

(22) Filed: Mar. 23, 2021

(65) Prior Publication Data

US 2023/0251379 A1 Aug. 10, 2023

(51) Int. Cl.

| | |
|---|---|
| ***G01S 17/66*** | (2006.01) |
| ***F41H 13/00*** | (2006.01) |
| ***G01S 7/481*** | (2006.01) |
| ***G01S 7/486*** | (2020.01) |
| ***G01S 7/497*** | (2006.01) |
| ***G01S 17/58*** | (2006.01) |
| ***G01S 17/86*** | (2020.01) |

(52) U.S. Cl.

CPC .......... *G01S 17/66* (2013.01); *F41H 13/0062* (2013.01); *G01S 7/4814* (2013.01); *G01S 7/4868* (2013.01); *G01S 7/497* (2013.01); *G01S 17/58* (2013.01); *G01S 17/86* (2020.01)

(58) Field of Classification Search

CPC ............................ F41H 13/0062; G01S 17/86

See application file for complete search history.

(56) References Cited

U.S. PATENT DOCUMENTS

| | | | | |
|---|---|---|---|---|
| 4,667,109 | A * | 5/1987 | Kano | G03F 9/70 250/461.1 |
| 5,125,736 | A * | 6/1992 | Vaninetti | G01S 17/08 356/5.1 |
| 9,472,919 | B2 * | 10/2016 | Rowen | H01S 3/06716 |
| 9,869,754 | B1 * | 1/2018 | Campbell | G01S 7/4814 |
| 10,401,499 | B2 | 9/2019 | Marron et al. | |

(Continued)

OTHER PUBLICATIONS

ThorLabs, DMLP1500R https://www.thorlabs.com/thorproduct.cfm?partnumber=DMLP1500R (Year: 2018).*

(Continued)

*Primary Examiner* — Helal A Algahaim
*Assistant Examiner* — Clara G Chilton

(57) ABSTRACT

A system includes a laser source configured to generate laser energy and a LADAR source configured to generate LADAR energy. The system also includes a beam director configured to direct the laser energy as a laser beam towards a target and to direct the LADAR energy as a LADAR beam towards the target. The system further includes a LADAR detector configured to sense a received portion of the LADAR energy reflected from the target. In addition, the system includes one or more first filters configured to attenuate at least a portion of the laser energy following an optical path towards the LADAR detector while allowing at least part of the received portion of the LADAR energy reflected from the target to pass to the LADAR detector.

20 Claims, 4 Drawing Sheets

(56) References Cited

U.S. PATENT DOCUMENTS

| | | | | |
|---|---|---|---|---|
| 10,502,951 | B2 | 12/2019 | Sitter, Jr. et al. | |
| 10,557,927 | B2 | 2/2020 | Marron et al. | |
| 10,754,038 | B2 | 8/2020 | Marron et al. | |
| 2004/0041108 | A1* | 3/2004 | Shaffer | G01S 7/497 250/559.3 |
| 2016/0184924 | A1* | 6/2016 | Kalender | F41H 13/0062 250/201.1 |
| 2018/0106894 | A1* | 4/2018 | Morikawa | G01S 17/42 |
| 2020/0018859 | A1* | 1/2020 | Schnitzer | G01S 7/484 |
| 2021/0003672 | A1* | 1/2021 | Yokogawa | A61B 1/0655 |

OTHER PUBLICATIONS

ThorLabs, FLH1030-10 https://www.thorlabs.com/thorproduct.cfm?partnumber=FLH1030-10 (Year: 2016).*

ThorLabs "Hard-Coated NIR Bandpass Filters"—FLH1030-10, sold in 2016. https://www.thorlabs.com/newgrouppage9.cfm?objectgroup_id=16235&pn=FLH1030-10 (Year: 2016).*

* cited by examiner

COMBINED HIGH-ENERGY LASER (HEL) SYSTEM OR OTHER SYSTEM AND LASER DETECTION AND RANGING (LADAR) SYSTEM

TECHNICAL FIELD

This disclosure is generally directed to laser systems. More specifically, this disclosure is directed to a combined high-energy laser (HEL) system or other system and laser detection and ranging (LADAR) system.

BACKGROUND

High-energy laser (HEL) systems are being developed for a number of commercial and defense-related applications. For example, high-energy lasers may be used to direct HEL beams at incoming missiles, rockets, mortars, or other targets. These and other types of HEL systems often need to integrate a number of functions, such as target tracking, target imaging, aimpoint selection, and atmospheric compensation.

SUMMARY

This disclosure provides a combined high-energy laser (HEL) system or other system and laser detection and ranging (LADAR) system.

In a first embodiment, a system includes a laser source configured to generate laser energy and a LADAR source configured to generate LADAR energy. The system also includes a beam director configured to direct the laser energy as a laser beam towards a target and to direct the LADAR energy as a LADAR beam towards the target. The system further includes a LADAR detector configured to sense a received portion of the LADAR energy reflected from the target. In addition, the system includes one or more first filters configured to attenuate at least a portion of the laser energy following an optical path towards the LADAR detector while allowing at least part of the received portion of the LADAR energy reflected from the target to pass to the LADAR detector.

In a second embodiment, a method includes generating laser energy and generating LADAR energy. The method also includes directing the laser energy as a laser beam towards a target and directing the LADAR energy as a LADAR beam towards the target. The method further includes sensing a received portion of the LADAR energy reflected from the target using a LADAR detector. In addition, the method includes, using one or more first filters, attenuating at least a portion of the laser energy following an optical path towards the LADAR detector while allowing at least part of the received portion of the LADAR energy reflected from the target to pass to the LADAR detector.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figures 1, 5:
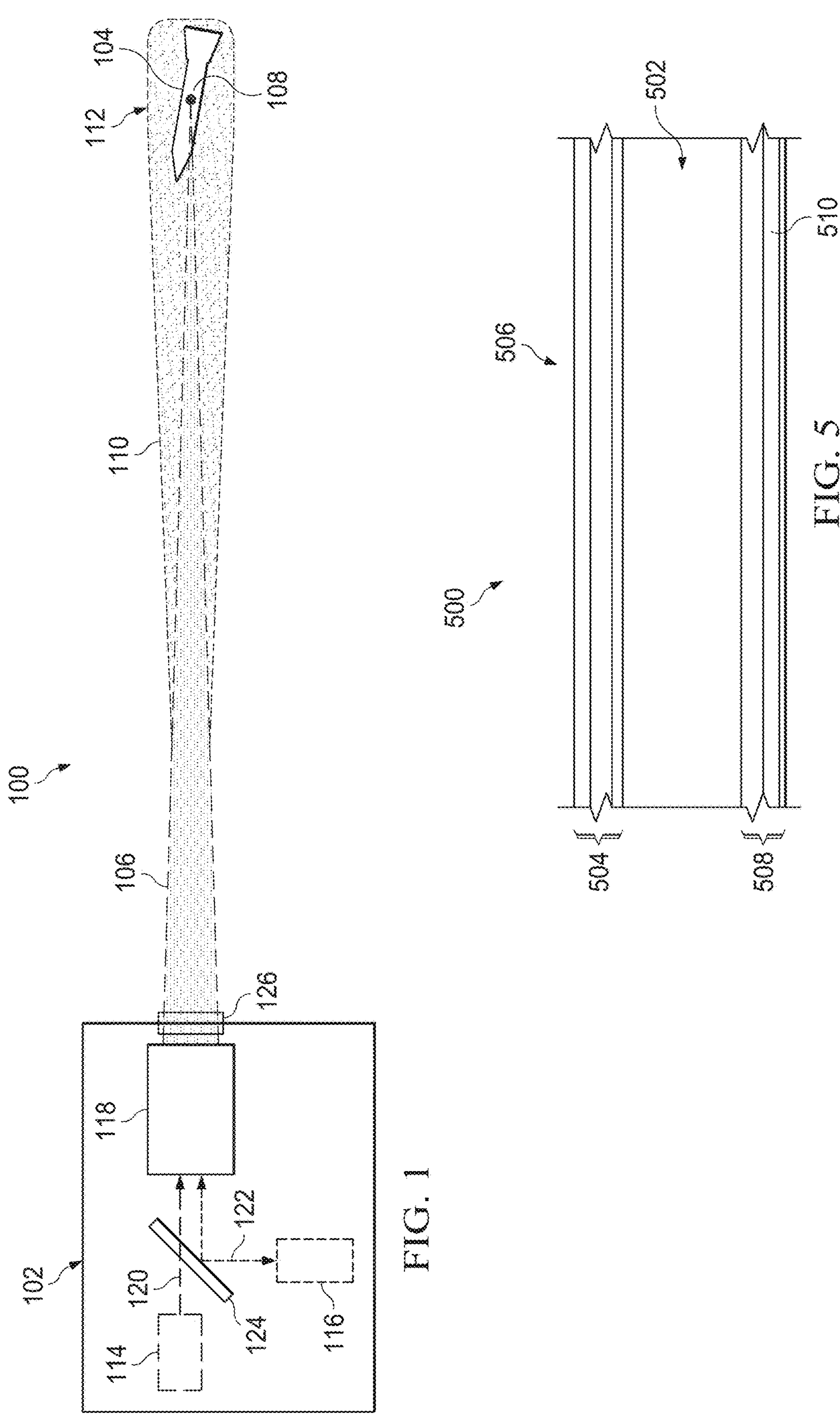
FIG. 1 illustrates an example application for a combined high-energy laser (HEL) and laser detection and ranging (LADAR) system according to this disclosure.
FIG. 5 illustrates an example architecture for filters in a combined HEL and LADAR system according to this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, high-energy laser (HEL) systems are being developed for a number of commercial and defense-related applications. For example, high-energy lasers may be used to direct HEL beams at incoming missiles, rockets, mortars, drones, unmanned aerial systems, and/or other targets. These and other types of HEL systems often need to integrate a number of functions, such as target tracking, target imaging, aimpoint selection, and atmospheric compensation.

Laser detection and ranging (LADAR) systems have been developed that can support one, some, or all of these functions. For instance, direct detection LADAR systems can be used for precision target tracking, three-dimensional (3D) imaging, target identification, aimpoint selection, and damage assessment. Coherent detection LADAR systems can be used for compensated imaging, precision velocity measurements, and atmospheric or other turbulence detection and correction, such as in systems based on digital holographic (DH) detection. Unfortunately, LADAR systems often operate by counting individual photons received at a detector. Also, some LADAR systems operate at high pulse repetition frequencies (PRFs), such as up to 100 kHz, up to 200 kHz, or more. As a result, using a LADAR system with laser systems producing substantially high energy outputs (such as an HEL system) can be difficult since such laser systems produce much larger amounts of laser energy that can hinder, effectively blind, or damage the LADAR system. This can be problematic, for example, when the laser system and the LADAR system share a common aperture. This can also be problematic when back-reflections of laser energy by optics or other components or atmospheric backscatter of laser energy occurs.

This disclosure provides combined laser (such as HEL) and LADAR systems that enable the simultaneous generation and use of both a laser beam (such as an HEL beam in some embodiments) and a LADAR beam. Each of the combined systems is able to generate a laser beam and to direct the laser beam towards a target while simultaneously using direct detection, coherent detection, and/or other LADAR to support functions such as target tracking, target imaging, aimpoint selection, atmospheric compensation, and other functions. The combined systems support very effective optical isolation of laser energy from a LADAR detector, which allows the laser energy to be directed towards a target while the LADAR energy can be reflected from the target and used for direct detection, coherent detection, or other LADAR-based functions. A common beam director and a common aperture may be used with the laser and LADAR beams. In addition, filters are used to help attenuate any laser energy that is directed along an optical path towards one or more LADAR detectors, such as HEL energy reflected from a target, back-reflections of HEL energy, or atmospheric backscatter of HEL energy.

In this way, more effective systems can be designed to support the use of both HEL or other beams and LADAR beams, which supports the integrated use of HEL or other systems and LADAR systems. Note that while various embodiments and aspects of the disclosure are discussed below with reference to a combined HEL-LADAR system (which produces an HEL beam), the disclosed systems, methods, and techniques can be used with any other suitable laser sources that produce laser energy that may potentially interfere with or otherwise negatively impact the operation of one or more LADAR detectors.

FIG. 1 illustrates an example application 100 for a combined HEL and LADAR system 102 according to this disclosure. As shown in FIG. 1, the combined system 102 is being used to engage a target 104. The target 104 in this example represents a rocket or missile. However, the combined system 102 may be used with any other suitable targets, such as one or more targets on the ground, in the air, or in space. The target 104 may also represent a specified area of interest. The combined system 102 may also be used with any suitable non-defense-related targets. In general, the combined HEL and LADAR functionality described in this patent document may be used with any suitable system and for any suitable purpose.

The combined system 102 in this example generates an HEL beam 106, which may typically be focused onto a relatively small area 108 (often referred to as a "hit spot") of the target 104. The HEL beam 106 represents a beam of laser energy that typically has a relatively high power or energy level, such as at least about 10 kW of power. Often times, the HEL beam 106 is ideally focused to as small an area 108 as possible on the target 104, such as when focused to an area that is about 0.1 meters in diameter. This is done in order to achieve the maximum possible effect on the target 104.

The combined system 102 in this example also generates a LADAR beam 110, which may typically be expanded to illuminate a relatively large area 112 (often referred to as an "illumination area") that includes the target 104. Often times, the LADAR beam 110 is expanded to illuminate a much larger area than the area 108, such as when the LADAR beam 110 is expanded to an illumination diameter of about 4 meters. Some of the laser energy from the LADAR beam 110 reflects from the target 104 and travels back to the combined system 102, where the reflected laser energy is detected in order to perform functions such as target tracking, target imaging, aimpoint selection, atmospheric compensation, or other direct, coherent, or other LADAR functions. The LADAR beam 110 typically has a much lower power or energy level compared to the HEL beam 106.

The combined system 102 here includes an HEL system 114, a LADAR system 116, and a beam director 118. The HEL system 114 generally operates to produce HEL energy 120, which is used by the beam director 118 to form the HEL beam 106 that is focused onto or otherwise directed at the target 104. The LADAR system 116 generally operates to produce LADAR energy 122, which is used by the beam director 118 to form the LADAR beam 110 that illuminates the target 104. The beam director 118 generally operates to focus, expand, or otherwise process laser energy and to direct the laser energy in one or more desired directions. The HEL system 114 includes any suitable structure configured to generate a high-energy laser output. The LADAR system 116 includes any suitable structure configured to generate a LADAR laser output. The beam director 118 includes any suitable structure configured to direct one or more laser beams.

In this example, at least one optical device 124 is used to help provide the HEL energy 120 and the LADAR energy 122 to the beam director 118. In this particular example, an optical device 124 is highly transmissive for the HEL energy 120 and highly reflective for the LADAR energy 122, which allows both the HEL energy 120 and the LADAR energy 122 to be directed towards the beam director 118. However, this specific implementation of the optical device 124 is for illustration only. In general, multiple optical devices 124 may often be used to provide the HEL energy 120 and the LADAR energy 122 to the beam director 118, as well as optionally perform other functions for one or more other optical energies. Each optical device 124 can have any desired transmittance and/or reflectance property or properties at one or more wavelengths as needed or desired in order to route one or more optical energies to one or more desired destinations. As described in more detail below, one or more optical devices 124 support a filtering (attenuation) function that reduces the optical power of HEL signals reaching at least one LADAR detector, which facilitates the use of both HEL and LADAR energy in the system 102. Also, in this example, the HEL beam 106 and the LADAR beam 110 are directed towards the target 104 from the beam director 118 through a common aperture 126. However, this need not be the case, and separate apertures may be provided for the HEL beam 106 and the LADAR beam 110.

The HEL beam 106 and the LADAR beam 110 can each have any suitable form and power level, which can vary depending on the application. For example, the LADAR energy 122 and the LADAR beam 110 may have a pulsed waveform and create a relatively low irradiance level on the target 104. The HEL energy 120 and the HEL beam 106 may have a continuous waveform and create a much higher irradiance level on the target 104, typically many orders of magnitude greater than the irradiance level on the target 104 created by the LADAR beam 110. In these or other types of systems, it is possible (in the absence of corrective actions) for the amount of HEL laser energy received by a detector in the LADAR system 116 to be multiple orders of magnitude higher than the amount of LADAR laser energy received by the detector in the LADAR system 116. In some specific applications, for instance, the amount of HEL laser energy received by the detector in the LADAR system 116 may be ten to twelve orders of magnitude higher than the amount of LADAR laser energy received by the detector in the LADAR system 116. Without corrective actions, the HEL laser energy can hinder, effectively blind, or damage the detector in the LADAR system 116.

In order to help resolve these or other issues, the combined system 102 uses one or more filters to (among other things) significantly attenuate the energy level of a reflected portion of the HEL energy 120 or HEL beam 106 that is heading towards the detector in the LADAR system 116. The one or more filters also allow a reflected portion of the LADAR beam 110 to be provided to the detector in the LADAR system 116. In addition, the HEL system 114 and the LADAR system 116 can respectively produce the HEL energy 120 and the LADAR energy 122 with narrow and well-separated wavelengths or wavelength ranges. For example, the HEL system 114 may produce the HEL energy 120 at a nominal wavelength of about 1080 nanometers (such as by using coherent combining of laser energy), and the LADAR system 116 may produce the LADAR energy 122 at a nominal wavelength of about 1030 nanometers.

Both of these wavelengths are achievable using ytterbium fiber amplifiers or other types of lasers in the HEL system 114 and the LADAR system 116. Collectively, these features allow the simultaneous use of both the HEL beam 106 and the LADAR beam 110, where the LADAR system 116 is able to effectively receive and process reflected LADAR energy even when the HEL beam 106 is being transmitted towards the target 104. Additional details regarding example implementations of the combined system 102 are provided below.

Although FIG. 1 illustrates one example application 100 for a combined HEL and LADAR system 102, various changes may be made to FIG. 1. For example, the combined system 102 may be used in any other suitable environment and for any other suitable purpose. Also, while shown here as being used to damage or destroy a moving hostile target 104, the combined system 102 can be used in any number of other ways depending on the application.

There are various commercial and other non-defense-related applications for high-energy laser systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
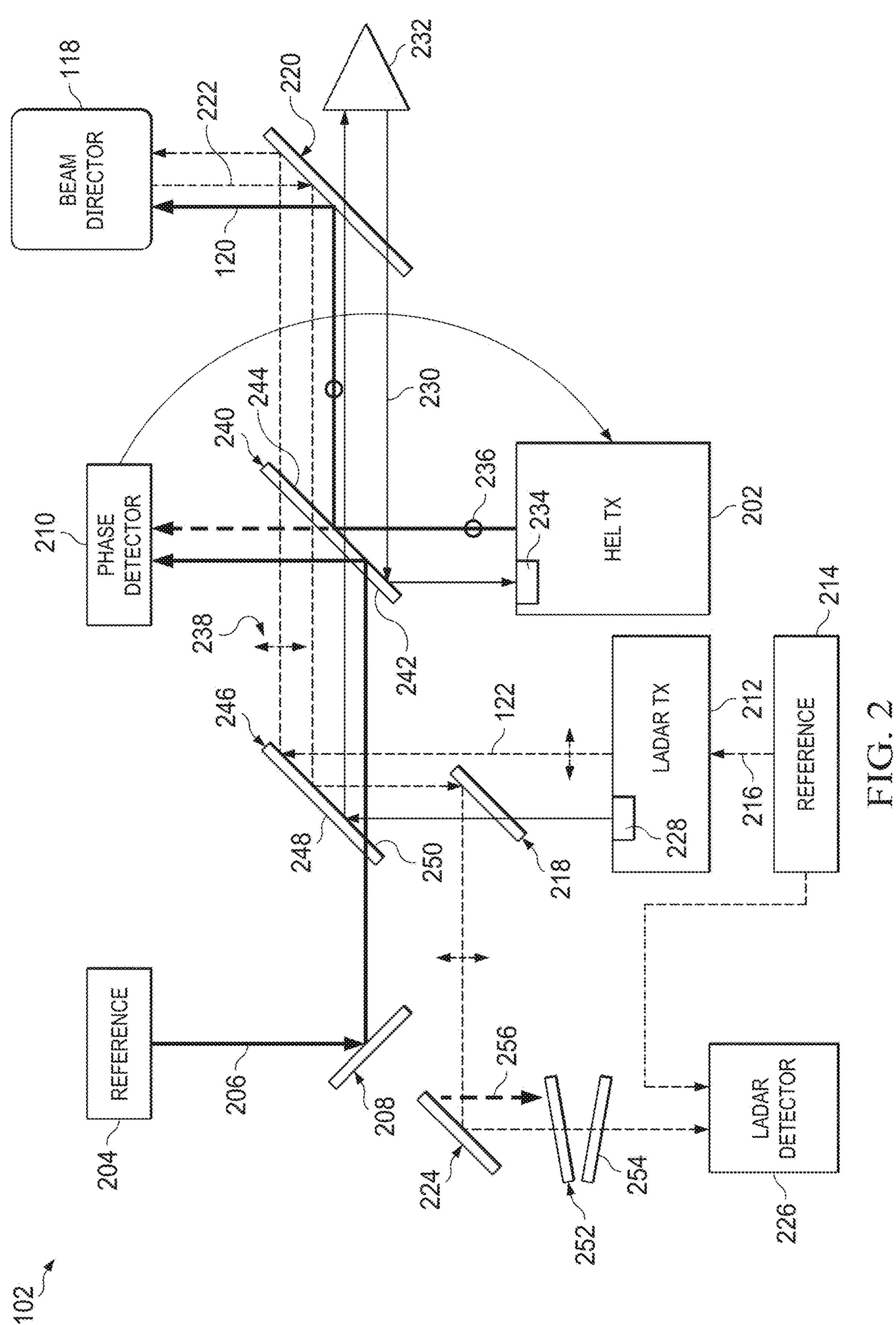
FIGS. 2 through 4 illustrate example combined HEL and LADAR systems according to this disclosure.
Figure 3:
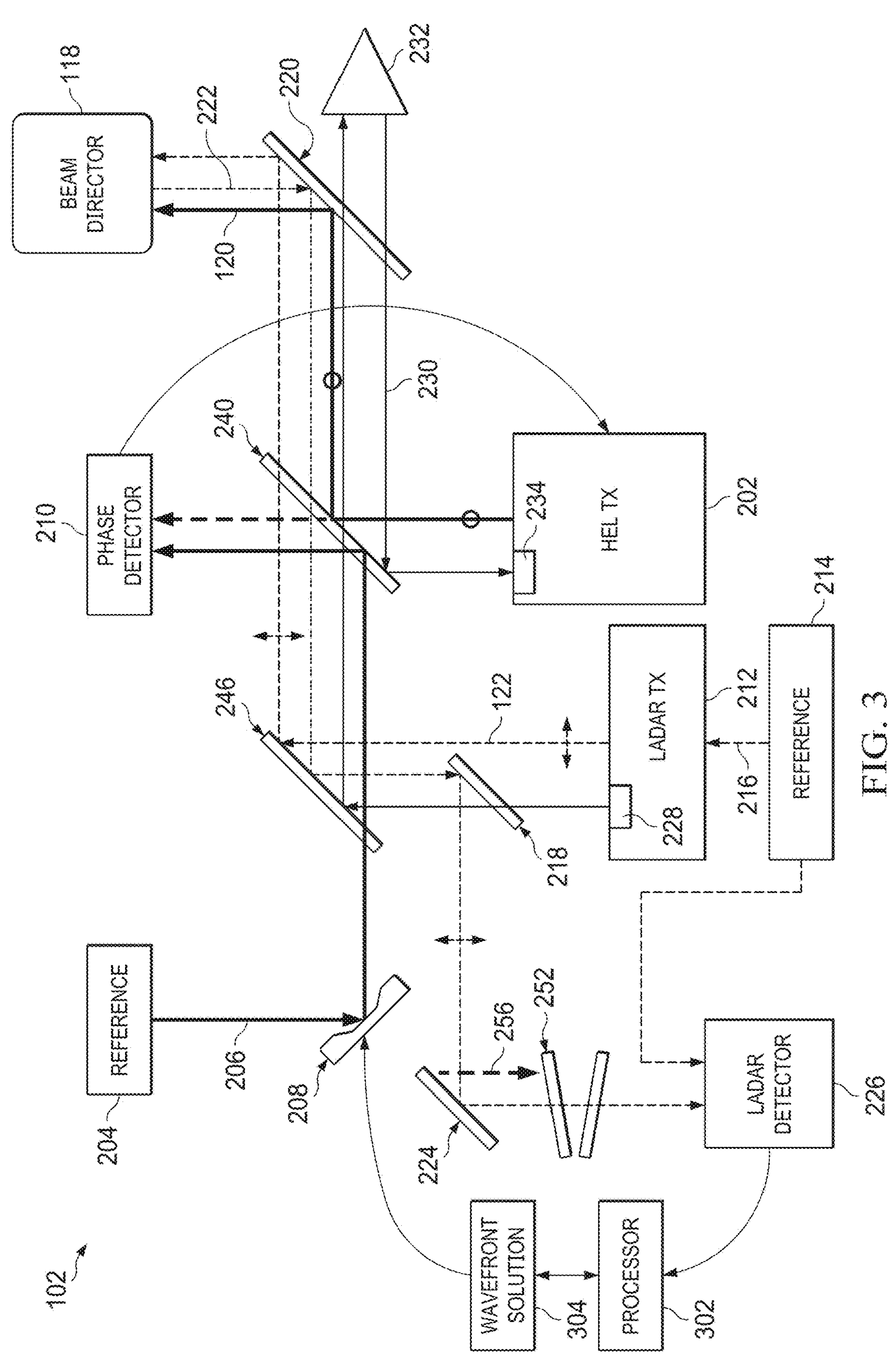
Figure 4:
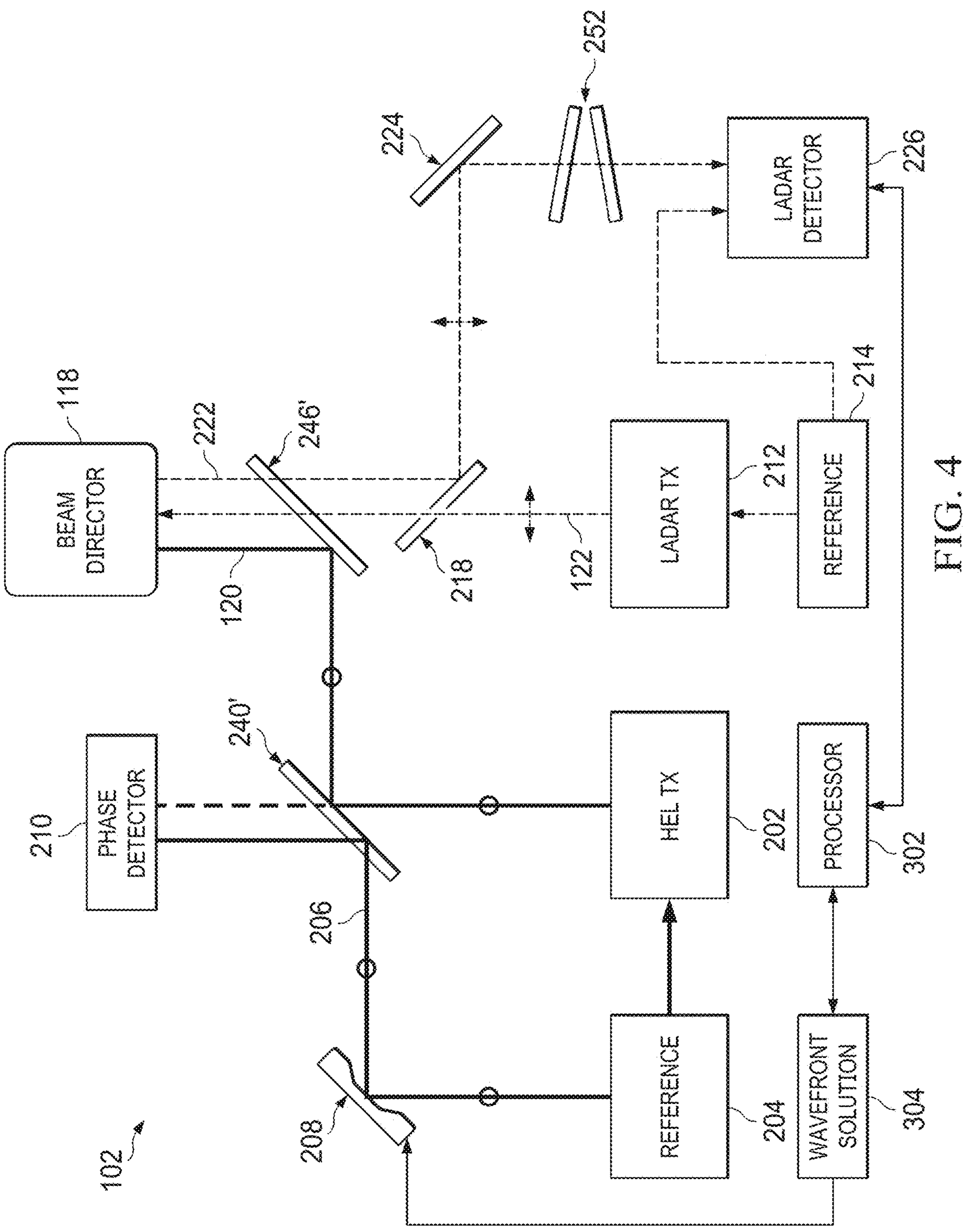

FIGS. 2 through 4 illustrate example combined HEL and LADAR systems 102 according to this disclosure. For ease of explanation, the combined systems 102 shown in FIGS. 2 through 4 may be described as being used in the application 100 of FIG. 1 to engage a hostile target 104. However, each of the combined systems 102 shown in FIGS. 2 through 4 may be used in any other suitable environment and for any other suitable purpose.

As shown in FIG. 2, the HEL system 114 is implemented in this example using an HEL laser transmitter (TX) 202, which generally operates to produce a beam of the HEL energy 120. As a result, the HEL laser transmitter 202 represents a source that is configured to generate the HEL energy 120. The HEL laser transmitter 202 includes any suitable structure configured to generate HEL energy, such as multiple laser diodes and a coherent beam combining (CBC) unit. In some embodiments, the HEL laser transmitter 202 operates to generate the HEL energy 120 at a nominal wavelength of about 1080 nanometers.

The HEL system 114 in this example also includes a reference laser source 204, which generally operates to produce a reference beam 206. In some embodiments, the reference beam 206 has a nominal wavelength of about 1080 nanometers. Also, in some embodiments, the reference beam 206 may be used by the HEL laser transmitter 202 to generate the HEL energy 120. The reference laser source 204 includes any suitable structure configured to generate a reference laser beam, such as one or more laser diodes. The reference beam 206 is reflected from a mirror 208, which represents any suitable reflective surface and may be controllably deformable in some embodiments.

A portion of the HEL energy 120 and the reference beam 206 are provided to a phase detector 210 of the HEL system 114. The phase detector 210 generally operates to measure any phase differences between the portion of the HEL energy 120 and the reference beam 206. The phase detector 210 includes any suitable structure configured to measure phase differences, such as a CBC phase detector. The phase differences are used to control the operation of the HEL laser transmitter 202. For example, the HEL laser transmitter 202 may be controlled so that the HEL energy 120 is substantially all at a specified wavelength (such as about 1080 nanometers) or within a very narrow range of wavelengths around the specified wavelength and has a desired wavefront.

The LADAR system 116 in this example is implemented using a LADAR laser transmitter 212, which generally operates to produce a beam of the LADAR energy 122. As a result, the LADAR laser transmitter 212 represents a source that is configured to generate the LADAR energy 122. The LADAR laser transmitter 212 includes any suitable structure configured to generate LADAR energy, such as multiple laser diodes. In some embodiments, the LADAR laser transmitter 212 operates to generate the LADAR energy 122 at a nominal wavelength of about 1030 nanometers.

A reference laser source 214 of the LADAR system 116 generally operates to produce a reference beam 216, which may be used by the LADAR laser transmitter 212 to generate the LADAR energy 122. In some embodiments, the reference beam 216 has a nominal wavelength of about 1030 nanometers. The reference laser source 214 includes any suitable structure configured to generate a reference laser beam, such as one or more laser diodes.

In this example, a number of optical devices (which may represent the one or more optical devices 124) are provided in the combined system 102. For example, the LADAR energy 122 is transmitted around a dichroic mirror 218 or through an aperture of the dichroic mirror 218, and the HEL energy 120 and the LADAR energy 122 are reflected from a dichroic mirror 220 towards the beam director 118. A beam of reflected LADAR energy 222 is also provided from the beam director 118 and reflected from the dichroic mirrors 218 and 220 and an additional mirror 224 towards a LADAR detector 226. Each dichroic mirror 218 and 220 includes any suitable structure configured to transit one or more wavelengths and reflect one or more wavelengths. The additional mirror 224 includes any suitable structure configured to reflect one or more wavelengths.

The LADAR detector 226 generally operates to measure photons contained in or otherwise associated with the beam of reflected LADAR energy 222. The counted photons can be used for direct detection, which involves operations based on the number of counted photons contained in the reflected LADAR energy 222. The beam of reflected LADAR energy 222 may also be mixed with the reference beam 216 prior to detection by the LADAR detector 226 to support coherent detection, which involves operations based on interference between the reflected LADAR energy 222 and the reference beam 216. The LADAR detector 226 includes any suitable structure configured to measure incoming optical energy, such as one or more Geiger mode avalanche photodiode (GmAPD) detectors.

In this particular example, an auto-alignment (AA) mechanism may optionally be provided in the combined system 102 in order to support proper alignment of the HEL beam 106 and the LADAR beam 110. Here, an AA source 228 is configured to generate an auto-alignment beam 230, which is transmitted through the dichroic mirrors 218 and 220 and is reflected from an AA retro-reflector 232. The auto-alignment beam 230 is then transmitted through the dichroic mirror 220 again and is provided to a position sensitivity detector (PSD) 234, which senses a position of the auto-alignment beam 230. The AA source 228 includes any suitable structure configured to generate an auto-alignment beam, such as one or more laser diodes. The auto-alignment beam 230 may have a lowest power level (relative to the HEL energy 120 and the LADAR energy 122) since it may only be used internally within the combined system 102. The AA retro-reflector 232 includes any suitable structure configured to reflect an auto-alignment beam. The position sensitivity detector 234 includes any suitable structure configured to sense or measure a position of an auto-alignment beam. It should be noted that while the AA source 228 is associated with the LADAR laser transmitter 212 and the position sensitivity detector 234 is associated with the HEL laser transmitter 202 here, the positions of the AA source 228 and the position sensitivity detector 234 may be reversed.

Note that two different notations are used in FIG. 2 to represent two different types of polarizations of optical energy. A circular notation 236 is used to represent s-polarization of light, which refers to polarization that is perpendicular to the plane of FIG. 2. A double-arrow notation 238 is used to represent p-polarization of light, which refers to polarization that is within the plane of FIG. 2. As can be seen here, the HEL energy 120 has s-polarization in this example, and the LADAR energy 122 has p-polarization in this example. However, these polarizations are for illustration only and can vary as needed or desired.

As noted above, filters can be provided in the combined system 102, and these filters can be used to perform various functions. In this example, a filter 240 represents an HEL filter and can be used to help direct the HEL energy 120 and the reference beam 206 to desired destinations. For example, a first surface 242 of the filter 240 can be highly transmissive (anti-reflective) for the reference beam 206, and a second surface 244 of the filter 240 can be highly reflective for the HEL energy 120 and the reference beam 206. Both surfaces 242 and 244 of the filter 240 can also be highly transmissive (anti-reflective) for the LADAR energy 122 and the reflected LADAR energy 222. This allows the bulk of the HEL energy 120 to be provided to the beam director 118, and this allows a portion of the HEL energy 120 and the reference beam 206 to be provided to the phase detector 210. This also allows the LADAR energy 122 and the reflected LADAR energy 222 to pass through the filter 240 substantially unmodified. In some embodiments, the filter 240 may be positioned so that the HEL energy 120, the reference beam 206, the LADAR energy 122, and the reflected LADAR energy 222 all have an angle of incidence of about 45° on the surface(s) 242 and 244 of the filter 240. Note that, in some cases, surface scattering of the HEL energy 120 from the filter 240 may represent the largest source of scattered radiation at the HEL wavelength, which may be due to the proximity of the filter 240 to the HEL laser transmitter 202 and limits of surface roughness achievable with one or more coatings of the filter 240.

A filter 246 allows the LADAR energy 122 and the reflected LADAR energy 222 to travel part of the same path as the reference beam 206. For example, a first surface 248 of the filter 246 can be highly transmissive for the reference beam 206, and a second surface 250 of the filter 246 can be highly transmissive for the reference beam 206 and highly reflective for the LADAR energy 122 and the reflected LADAR energy 222. This allows the LADAR energy 122 to be provided towards the beam director 118 and the reflected LADAR energy 222 to be provided towards the LADAR detector 226. This also allows the reference beam 206 to be provided towards the filter 240 substantially unmodified. In some embodiments, the filter 246 may be positioned so that the reference beam 206, the LADAR energy 122, and the reflected LADAR energy 222 all have an angle of incidence of about 45° on the surface(s) 248 and 250 of the filter 246.

One or more filters 252 represent one or more attenuation filters that are used to attenuate any portion 256 of the HEL energy 120 that might be reflected from a target 104 or that is otherwise reflected back or travels along an optical path towards the LADAR detector 226. As noted above, HEL energy 120 received at the LADAR detector 226 may interfere with or damage the LADAR detector 226, which can prevent the LADAR system 116 from performing one or more desired functions. Here, each surface 254 of each filter 252 can be highly transmissive for the reflected LADAR energy 222 and highly reflective for the HEL energy 120. In some embodiments, each filter 252 may be positioned so that the reflected LADAR energy 222 and any HEL energy 120 have an angle of incidence of about 10° on the surface(s) 254 of the filter(s) 252. If multiple filters 252 are used here, the filters 252 can be arranged in a stacked configuration, meaning the reflected LADAR energy 222 (and any stray HEL energy 120) pass through the multiple filters 252 prior to reaching the LADAR detector 226.

Note that the phrases "highly transmissive" and "highly reflective" here respectively indicate that substantially all of specified optical energy passes through or is reflected from a filter. For example, in some embodiments, "highly transmissive" indicates that at least 99.5% to at least 99.9% of specified optical energy passes through a filter, and "highly reflective" indicates that at least 99.5% to at least 99.9% of specified optical energy is reflected from a filter. Because of this, if each of two surfaces 254 of two filters 252 have a 99.9% transmittance for the reflected LADAR energy 222 and a 99.9% reflectance for the HEL energy 120, the two filters 252 would collectively provide an attenuation of the HEL energy 120 relative to the reflected LADAR energy 222 of $[0.999/0.001]^4$, which is a relative attenuation of approximately twelve orders of magnitude. Note, however, that one filter 252 or more than two filters 252 may be used, and the surfaces 254 of the filter(s) 252 may provide different levels of transmittance and reflectance as needed or desired.

Each of the filters 240, 246, 252 represents any suitable optical device with desired transmittance and reflectance properties. For example, each of the two major surfaces of the filters 240, 246, 252 may be fabricated as a stack of layers over a substrate, where the stack of layers is designed to provide a desired transmittance or reflectance at one or more wavelengths.

FIG. 3 expands the combined system 102 of FIG. 2 to include at least one processor 302, which uses inputs from the LADAR detector 226 (and possibly other input data) to generate one or more wavefront solutions 304. Each wavefront solution 304 identifies how the wavefront of the HEL beam 106 can be modified to, for instance, compensate for atmospheric distortions or other turbulence. In this example, each wavefront solution 304 can be applied to the mirror 208, which in this embodiment represents a deformable mirror. The deformable mirror 208 can be deformed based on the wavefront solution 304 in order to vary the wavefront of the reference beam 206 that is provided to the phase detector 210. This causes the phase detector 210 to then modify the HEL energy 120 produced by the HEL laser transmitter 202. Ideally, the HEL energy 120 produced by the HEL laser transmitter 202 will be used to generate an HEL beam 106 with reduced or minimized wavefront errors at the target 104.

The processor 302 includes any suitable structure configured to generate wavefront solutions 304 for reducing or minimizing wavefront errors. The processor 302 may, for example, include one or more microprocessors, microcontrollers, digital signal processors (DSPs), application specific integrated circuits (ASICs), field programmable gate arrays (FPGAs), or discrete circuitry. Note that the wavefront solutions 304 may be used in other ways to pre-compensate for atmospheric distortions or other turbulence, such as when the wavefront solutions 304 are used by the HEL laser transmitter 202 to control the generation of the HEL energy 120.

It should be noted here that the exact arrangement of optical components in a combined HEL and LADAR system 102 can vary based on a number of factors. For example, in FIGS. 2 and 3, these embodiments of the combined system 102 may use a deformable mirror 208 in the path of the lower-power reference beam 206, rather than in the path of the higher-power HEL energy 120. However, other embodiments may use a deformable mirror placed in the optical path of the HEL energy 120. As another example, it is possible to rearrange components in the combined HEL and LADAR system 102 so that different beams are transmitted and reflected in different ways. One example of this is shown in FIG. 4.

As shown in FIG. 4, various components of the combined system 102 have been rearranged. Also, the filter 240 described above has been replaced with a filter 240', which reflects the HEL energy 120 and the reference beam 206. In addition, the filter 246 described above has been replaced with a filter 246', which reflects the HEL energy 120 and transmits the LADAR energy 122 and reflected LADAR energy 222. Thus, FIG. 4 illustrates one example alternative arrangement of optical sources and filters in a combined HEL and LADAR system 102. Other alternative arrangements of optical sources and filters may be used in any other suitable manner in a combined HEL and LADAR system 102. Note that while not shown here, an auto-alignment mechanism similar to the one shown in FIGS. 2 and 3 may be used in FIG. 4 if needed or desired.

Although FIGS. 2 through 4 illustrate examples of combined HEL and LADAR systems 102, various changes may be made to FIGS. 2 through 4. For example, while various mirrors and filters are shown as being used to transmit or reflect optical signals, these specific mirrors and filters can vary depending on the arrangement of elements within the combined system 102. Also, each of the HEL system 114 and the LADAR system 116 may be implemented in any other suitable manner.

FIG. 5 illustrates an example architecture 500 for filters in a combined HEL and LADAR system 102 according to this disclosure. For example, the architecture 500 shown in FIG. 5 may be used with any of the filters 240, 240', 246, 246', 252 described above. As shown in FIG. 5, the architecture 500 includes a substrate 502, a first stack 504 of dielectric layers 506 positioned on one major surface of the substrate 502, and a second stack 508 of dielectric layers 510 positioned on the opposite major surface of the substrate 502.

The substrate 502 generally represents a layer of material that is optically transparent to one or more wavelengths of light. Each stack 504, 508 generally represents a collection of layers 506, 510 that are designed to provide a desired transmittance or reflectance for one or more wavelengths of light. For example, a stack 504, 508 of layers 506, 510 may be designed to substantially transmit light at one or more wavelengths and to substantially reflect light at one or more different wavelengths. Among other things, this can be achieved using suitable thicknesses of the layers 506, 510 in the stacks 504, 508.

The stacks 504, 508 of layers 506, 510 in the filters 240, 240', 246, 246', 252 can be designed differently for the different filters in order to provide the transmittance and reflectance properties described above. For example, in the filter 240, the stack 504 may be used as the surface 242 of the filter 240, and the stack 504 may be highly transmissive for the reference beam 206, the LADAR energy 122, and the reflected LADAR energy 222. Also, in the filter 240, the stack 508 may be used as the surface 244 of the filter 240, and the stack 508 may be highly reflective for the HEL energy 120 and the reference beam 206 and highly transmissive for the LADAR energy 122 and the reflected LADAR energy 222. In the filter 246, the stack 504 may be used as the surface 248 of the filter 246, and the stack 504 may be highly transmissive for the reference beam 206. Also, in the filter 246, the stack 508 may be used as the surface 250 of the filter 246, and the stack 508 may be highly transmissive for the reference beam 206 and highly reflective for the LADAR energy 122 and the reflected LADAR energy 222. In each filter 252, each stack 504 and 508 may be used as one of the surfaces 254, and each stack 504 and 508 may be highly transmissive for the reflected LADAR energy 222 and highly reflective for the HEL energy 120. Other types of stack designs may be used in other embodiments, such as when the stack designs are modified for the filters 240' and 246'.

The material quality and surface preparation of the substrate 502 may be tightly controlled during fabrication of the substrate 502, since these factors can play a role in providing damage resistance (particularly for devices that receive the HEL energy 120). For example, the substrate 502 may be formed using a bulk material that is as free of impurities and index inhomogeneities as possible. As another example, a super-polishing technique (such as magnetorheological finishing or "MRF") on the surfaces of the substrate 502 (on which the stacks 504 and 508 will be formed) can minimize polishing residue and impurities, resulting in finished surfaces that are as free of surface defects as possible with minimal surface roughness. High spatial resolution scanning of the surfaces of the substrate 502, such as using instruments capable of locating surface defects as small as 5 μm in diameter or other sizes, prior to formation of the stacks 504 and 508 may be performed to ensure optimal surface quality and cleanliness. Compensation curvatures can be polished onto the substrate 502, such as once stress characteristics of the coating have been interferometrically or otherwise measured on representative test pieces. Handling techniques for the finished substrate 502 after final inspection can be used to maintain surface cleanliness.

The formation of each of the stacks 504 and 508 may involve the use of a deposition technique that optimizes coating flexibility and minimizes coating stress, which helps to minimize the probability of coating rupture and subsequent catastrophic coating failure under high irradiance operations. Since localized surface defect heating can cause substrate expansion, a deposition technique that produces structural flexibility in a coating may be used for the survival of high reflection and dichroic optical coatings under high irradiance operations. For example, an enhanced electron beam—high energy plasma assist deposition process with evaporation rate and temperature control can be used to produce such coatings with the use of real-time optical monitoring to ensure low absorption in the dielectric layers 506, 510. For multiple-wavelength optics (such as filters with high transmittance and high reflectance at different wavelengths), dielectric layers at the beginning and end of each stack 504, 508 can be optimized for the desired transmission or reflectance properties with the use of multi-stage deposition rate control to optimize layer uniformity. Both high-index and low-index coating materials, such as $Hf_2O_3$ and $SiO_2$, can be lot-tested for high irradiance laser damage thresholds, and simpler stack designs can be tested with candidate materials to quantify material damage performance and compatibility prior to incorporation into more complex stack designs for high power use. Note that dedicated coating chambers for use in forming the stacks 504, 508 may be useful (particularly for high-power continuous-wave coating development) in order to maintain the highest levels of coating purity and avoid material cross contamination.

Although FIG. 5 illustrates one example of an architecture 500 for filters in a combined HEL and LADAR system 102, various changes may be made to FIG. 5. For example, each of the filters 240, 240', 246, 246', 252 may be implemented in any other suitable manner. Also, each stack 504, 508 may have any suitable number of layers 506, 510 depending on the desired transmittance and/or reflectance property or properties of the stack.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:

a high-energy laser (HEL) source configured to generate laser energy;

a laser detection and ranging (LADAR) source configured to generate LADAR energy;

a reference laser source configured to generate a reference laser beam;

a beam director configured to direct the laser energy from the HEL source as an HEL laser beam towards a target and to direct the LADAR energy as a LADAR beam towards the target;

a LADAR detector configured to sense a received portion of the LADAR energy reflected from the target, wherein an amount of the received portion of the LADAR energy reflected from the target is lower than an amount of the laser energy from the HEL source following an optical path towards the LADAR detector;

multiple filters comprising:

at least one first filter configured to attenuate any portion of the laser energy from the HEL source that follows the optical path towards the LADAR detector while allowing at least part of the received portion of the LADAR energy reflected from the target to pass to the LADAR detector, wherein the at least one first filter is highly transmissive at about 1030 nanometers and highly reflective at about 1080 nanometers; and at least one second filter configured to (i) reflect a majority of the laser energy from the HEL source towards the beam director, (ii) transmit a portion of the laser energy from the HEL source to a phase detector, and (iii) reflect the reference laser beam towards the phase detector, wherein the phase detector is configured to measure a phase difference between the portion of the laser energy from the HEL source and the reference laser beam, wherein the HEL source is configured to pre-compensate for atmospheric distortions or other turbulence by using the phase difference to reduce errors in a wavefront of the laser energy from the HEL source at the target.

2. The system of claim 1, wherein the multiple filters are arranged in a stacked configuration.

3. A system comprising:

a high-energy laser (HEL) source configured to generate laser energy at a first wavelength;

a laser detection and ranging (LADAR) source configured to generate LADAR energy at a second wavelength;

a reference laser source configured to generate a reference laser beam;

a beam director configured to direct the laser energy from the HEL source as an HEL laser beam towards a target and to direct the LADAR energy as a LADAR beam towards the target;

a LADAR detector configured to sense a received portion of the LADAR energy reflected from the target, wherein an amount of the received portion of the LADAR energy reflected from the target is lower than an amount of the laser energy from the HEL source at the LADAR detector reflected from the target;

one or more first filters configured to attenuate any portion of the laser energy from the HEL source that follows an optical path towards the LADAR detector while allowing at least part of the received portion of the LADAR energy reflected from the target to pass to the LADAR detector; and a second filter configured to (i) reflect a majority of the laser energy from the HEL source towards the beam director, (ii) transmit a portion of the laser energy from the HEL source to a phase detector, and (iii) reflect the reference laser beam at the first wavelength from the reference source towards the phase detector, wherein the phase detector is configured to measure a phase difference between the portion of the laser energy from the HEL source and the reference laser beam, wherein the HEL source is configured to pre-compensate for atmospheric distortions or other turbulence by using the phase difference to reduce errors in a wavefront of the laser energy from the HEL source at the target.

4. The system of claim 3, further comprising:

a third filter configured to reflect the LADAR energy from the LADAR source towards the beam director.

5. The system of claim 4, wherein:

the second filter is further configured to transmit the LADAR energy; and the third filter is further configured to transmit the reference laser beam.

6. The system of claim 3, further comprising:

a third filter configured to transmit the LADAR energy and reflect the laser energy from the HEL source.

7. A system comprising:

a high-energy laser (HEL) source configured to generate laser energy at a first wavelength;

a laser detection and ranging (LADAR) source configured to generate LADAR energy at a second wavelength;

a reference laser source configured to generate a reference laser beam;

a beam director configured to direct the laser energy from the HEL source as an HEL laser beam towards a target and to direct the LADAR energy as a LADAR beam towards the target;

multiple filters comprising:

at least one first filter configured to attenuate any portion of the laser energy from the HEL source that follows an optical path towards the LADAR detector while allowing at least part of the received portion of the LADAR energy reflected from the target to pass to the LADAR detector, wherein an amount of the received portion of the LADAR energy reflected from the target is lower than an amount of the laser energy from the HEL source at the LADAR detector reflected from the target, wherein the at least one first filter is configured to provide an attenuation of the laser energy from the HEL source that is greater than an attenuation of the received portion of the LADAR energy; and at least one second filter configured to (i) reflect a majority of the laser energy from the HEL source towards the beam director, (ii) transmit a portion of the laser energy from the HEL source to a phase detector, and (iii) reflect the reference laser beam towards the phase detector, wherein the phase detector is configured to measure a phase difference between the portion of the laser energy from the HEL source and the reference laser beam, wherein the HEL source is configured to pre-compensating for atmospheric distortions or other turbulence by using the phase difference to reduce errors in a wavefront of the laser energy from the HEL source at the target.

8. A system comprising:

a high-energy laser (HEL) source configured to generate laser energy at a first wavelength;

a laser detection and ranging (LADAR) source configured to generate LADAR energy at a second wavelength;

a reference laser source configured to generate a reference laser beam;

a beam director configured to direct the laser energy from the HEL source as an HEL laser beam towards a target and to direct the LADAR energy as a LADAR beam towards the target;

a LADAR detector configured to sense a received portion of the LADAR energy reflected from the target, wherein an amount of the received portion of the LADAR energy reflected from the target is lower than an amount of the laser energy from the HEL source at the LADAR detector reflected from the target;

multiple filters comprising:

at least one first filter configured to attenuate any portion of the laser energy from the HEL source that follows an optical path towards the LADAR detector while allowing at least part of the received portion of the LADAR energy reflected from the target to pass to the LADAR detector; and at least one second filter configured to (i) reflect a majority of the laser energy from the HEL source towards the beam director, (ii) transmit a portion of the laser energy from the HEL source to a phase detector, and (iii) reflect the reference laser beam towards the phase detector, wherein the phase detector is configured to measure a phase difference between the portion of the laser energy from the HEL source and the reference laser beam, wherein the HEL source is configured to pre-compensate for atmospheric distortions or other turbulence by using the phase difference to reduce errors in a wavefront of the laser energy from the HEL source at the target;

an auto-alignment source configured to generate an auto-alignment beam;

a reflector configured to reflect the auto-alignment beam; and a detector configured to sense the reflected auto-alignment beam, wherein each of the auto-alignment source and the detector is associated with one of the HEL source and the LADAR source.

9. A method comprising:

generating high-energy laser (HEL) energy at a first wavelength;

generating laser detection and ranging (LADAR) energy at a second wavelength;

generating a reference laser beam;

directing the HEL energy as an HEL laser beam towards a target and directing the LADAR energy as a LADAR beam towards the target;

sensing a received portion of the LADAR energy reflected from the target using a LADAR detector, wherein an amount of the received portion of the LADAR energy reflected from the target is lower than an amount of the HEL energy at the LADAR detector reflected from the target;

using one or more first filters, attenuating any portion of the HEL energy that follows an optical path towards the LADAR detector while allowing at least part of the received portion of the LADAR energy reflected from the target to pass to the LADAR detector;

using a second filter, (i) reflecting a majority of the HEL energy towards a beam director, (ii) transmitting a portion of the HEL energy to a phase detector, and (iii) reflecting the reference laser beam at the first wavelength towards the phase detector, wherein the phase detector is configured to measure a phase difference between the portion of the HEL energy and the reference laser beam; and using the phase difference to pre-compensate for atmospheric distortions or other turbulence by reducing errors in a wavefront of the laser energy from the HEL source at the target.

10. The method of claim 9, wherein each of the one or more first filters is highly transmissive at a wavelength associated with the LADAR energy and highly reflective at a wavelength associated with the HEL energy.

11. The method of claim 10, wherein each of the one or more first filters is highly transmissive at about 1030 nanometers and highly reflective at about 1080 nanometers.

12. The method of claim 9, wherein the multiple filters are arranged in a stacked configuration.

13. The method of claim 9, further comprising:

using a third filter, reflecting the LADAR energy towards the beam director.

14. The method of claim 13, further comprising:

using the second filter, transmitting the LADAR energy; and using the third filter, transmitting the reference laser beam.

15. The method of claim 9, further comprising:

using a third filter, transmitting the LADAR energy and reflecting the HEL energy.

16. The method of claim 9, wherein:

the HEL source is configured to generate HEL energy corresponding to a first illumination area on the target;

the LADAR source is configured to generate LADAR energy corresponding to a second illumination area including the target, the second illumination area larger than the first illumination area; and the one or more first filters provide an attenuation of the HEL energy that is at least ten orders of magnitude greater than an attenuation of the received portion of the LADAR energy.

17. The method of claim 9, further comprising:

generating an auto-alignment beam using an auto-alignment source;

reflecting the auto-alignment beam; and sensing the reflected auto-alignment beam using a detector.

18. The system of claim 1, wherein the HEL laser source comprises a first ytterbium fiber amplifier.

19. The system of claim 18, wherein the LADAR source comprises a second ytterbium fiber amplifier.

20. The method of claim 9, wherein a ytterbium fiber amplifier is used to generate at least one of the HEL energy or the LADAR energy.

* * * * *